United States Patent [19]
McCarty et al.

[11] 3,973,519
[45] Aug. 10, 1976

[54] SCREENING DEVICE IN A CLOSED-LOOP AQUACULTURE SYSTEM

[75] Inventors: James C. McCarty, San Carlos; George Monaco, Los Altos, both of Calif.

[73] Assignee: Syntex (U.S.A.) Inc., Palo Alto, Calif.

[22] Filed: Oct. 7, 1974

[21] Appl. No.: 512,384

[52] U.S. Cl. ................................. 119/3; 119/5
[51] Int. Cl.² .................................... A01K 63/00
[58] Field of Search ................ 119/5, 3; 210/169

[56] References Cited
UNITED STATES PATENTS

| | | | |
|---|---|---|---|
| 3,513,978 | 6/1970 | Newsteder | 119/5 X |
| 3,557,753 | 1/1971 | Dantoni | 119/5 |
| 3,661,262 | 6/1972 | Sanders | 119/5 |
| 3,662,889 | 6/1972 | Takarabe | 119/5 |

*Primary Examiner*—Hugh R. Chamblee
*Attorney, Agent, or Firm*—Tom M. Moran

[57] ABSTRACT

This invention is a screening apparatus for retaining small marine animals in a growing container connected to closed-loop aquaculture system. The screening apparatus comprises (a) a first plate; (b) a second plate about the same size as the first plate and substantially parallel to and spaced from the first plate; (c) a conduit passing through a centrally-located aperture in the first plate, the end of the conduit being attached to a face of the second plate, the corresponding edges of said plates being about the same distance from the outer wall of the conduit; (d) a fluid permeable material extending between the edges of said plates and enclosing said conduit by being snugly fitted at least around the periphery of the first plate; (e) the conduit having apertures around its circumference; and (f) a pump means for transferring a fluid through the conduit. The screening device is particularly useful in a closed-loop aquaculture system which includes a biological filter means. The process for growing marine animals using the screening device is also disclosed.

9 Claims, 6 Drawing Figures

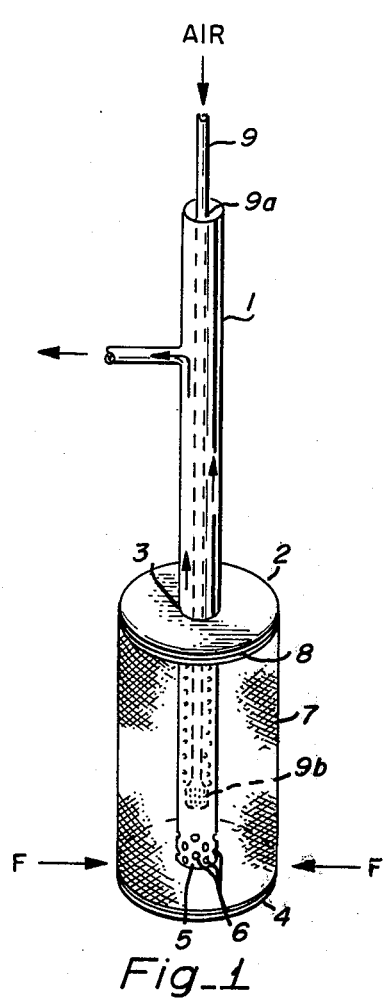
Fig_1
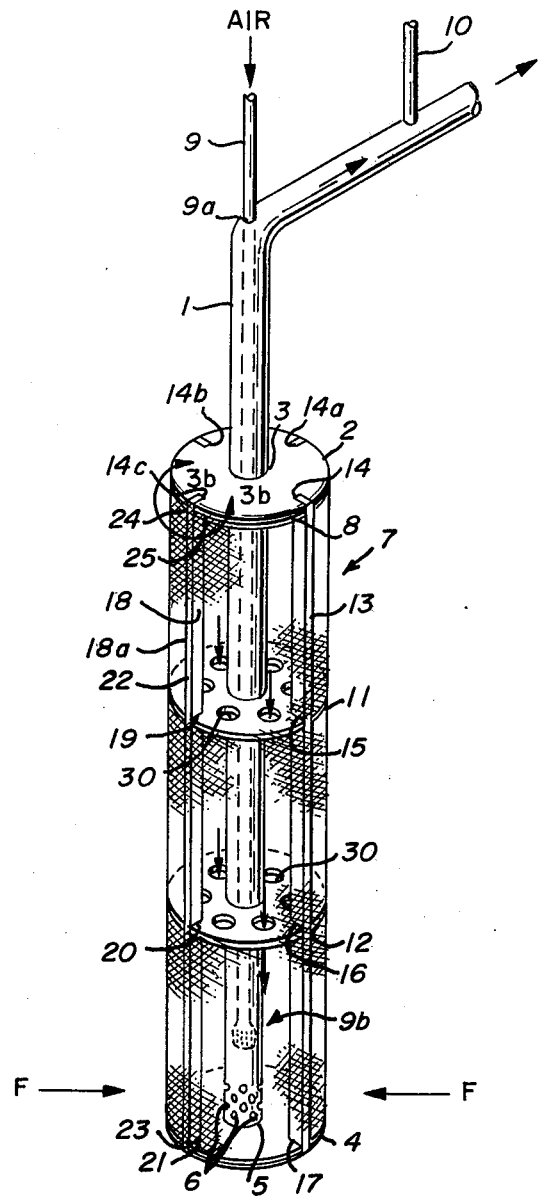
Fig_2

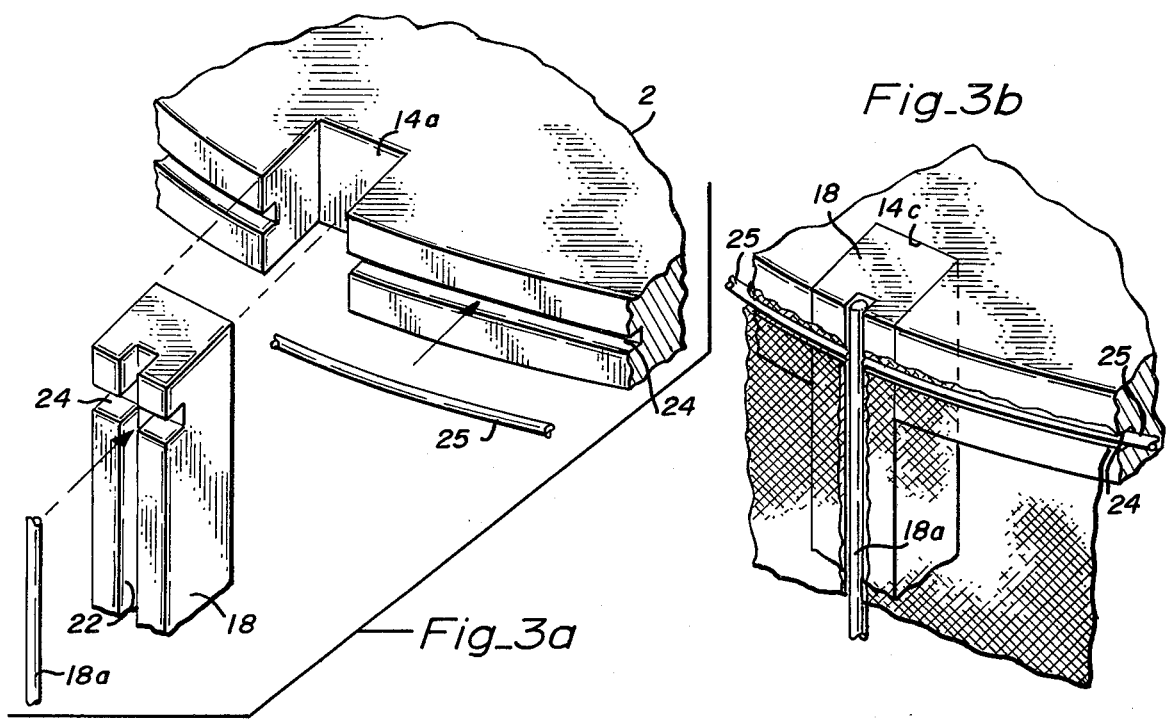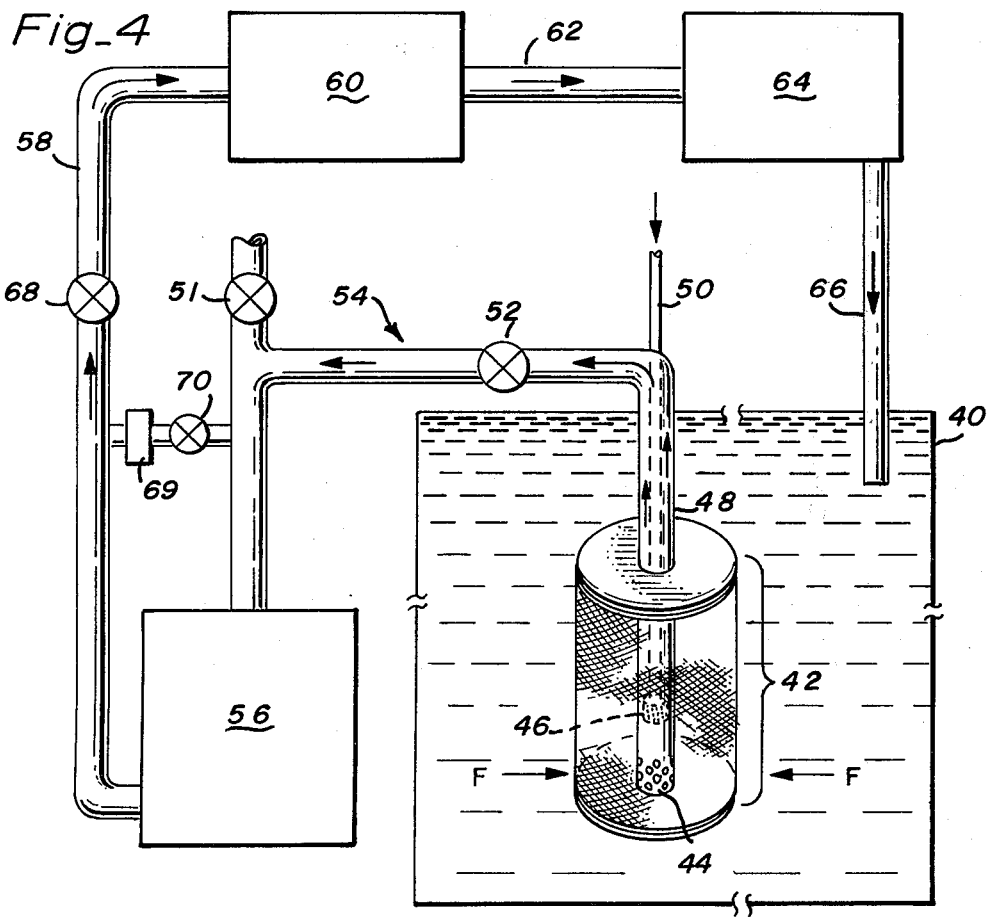

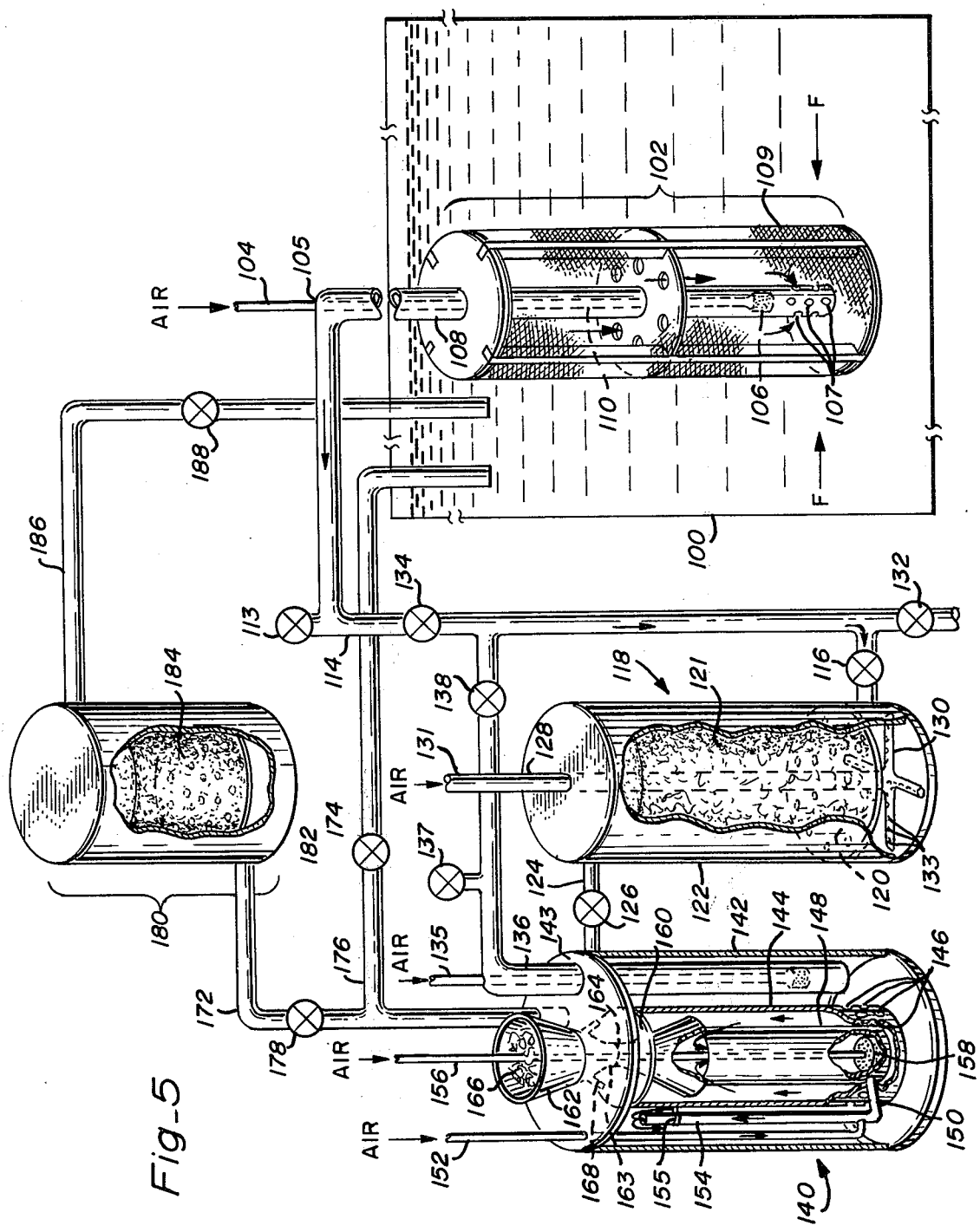
Fig_5

SCREENING DEVICE IN A CLOSED-LOOP AQUACULTURE SYSTEM

FIELD OF THE INVENTION

This invention relates to an improved apparatus and method for maintaining the purity of water which is used in a closed-loop aquaculture system.

DESCRIPTION OF THE PRIOR ART

As the demand for food throughout the world increases, it becomes more and more important to find ways to more efficiently produce food to satisfy the demand. It has been proposed to grow monocultures of aquatic animals under controlled conditions to increase the production of high protein food for human consumption. The medium for supporting aquatic animals is, of course, water, and the life-support system may be open (i.e. water is constantly replenished from an outside source) or closed (i.e. the same water is recirculated through the system).

A closed-loop aquaculture system offers many advantages over an open system. For example, since water is continually reused, expenses for supplying, moving and storing water are minimized. Additionally, if water is to be heated or refrigerated, the expense involved in maintaining the temperature in a closed-loop system is considerably less since once a volume of the water is brought to the desired temperature, little energy is required to maintain that temperature. Also, undesirable fluctuations are eliminated. Furthermore, food wastes are reduced because the food need not be flushed out of the tank as it is in systems wherein the water must be changed.

Other advantages of a closed-loop system include the ease of locating such aquaculture systems in geographical locations near the markets for the animal being grown rather than being limited to geographical locations near an estuary, ocean or where the water is free of contamination such as at relatively large distances from large metropolitan centers. With a closed-loop life support aquaculture system, geographical location is not important and one may culture marine prawns, fresh water prawns, marine fish, fresh water fish, etc. any place including arid areas with very little water. Closed-loop systems can utilize natural or synthetic sea water or dilutes of same (brackish). Once the water has been established in the system, marine or brackish water animals can be cultured hundreds of miles from the sea.

Also, recirculating the water enables the system to operate constantly without the necessity of changing water which may introduce unwanted contaminants such as pesticides, raw sewage, or other pollutants. These contaminants are deleterious to most cultured subjects, particularly to decapod larvae, wherein even parts per billion may result in death. Thus, it is important to develop a closed-loop, aquaculture system which employs a water purification system which will maintain the water in a high state of purity removing any contaminants present or maintaining the contaminants at a non harmful level.

Further, open systems, also do not provide the constant physical and chemical parameters that a closed system can. Animals on a open system are more susceptible to pH shock, temperature shock and salinity changes due to the exchange of $H_2O$. Heretofore, only cumbersome closed-loop life-support systems for the culture of aquatic animals have been proposed which include a water purification system having a biological filter, a resin base filter, a particulate filter, an intermediate pump, various positive displacement liquid pumps, and a protein skimmer. Such a system is disclosed in U.S. Pat. No. 3,661,262 issued May 9, 1972 to Sanders.

The system which is disclosed in U.S. Pat. No. 3,661,262 to Sanders is a system which is used for the culturing of fish, particularly pompano. That particular closed-loop aquaculture system is not only cumbersome and rather complex, but it does not discuss the problems which are inherent in attempting to raise macrobrachium species from the egg stage through the larvae and into the adult stage. As larvae, the macrobrachium species are extremely tiny and if they were thrown into a system such as that disclosed in the Sanders patent they would be sucked through the system and thus ultimately eliminated. Thus it is necessary to have a screening device in the growing container so that the larvae are retained in the container in a healthy condition. Since the larvae are very sensitive to any impurities in the system the materials used in the screen must be non-toxic. Thus, a device which requires a screen to be glued to a wood disc such as that disclosed in "Techniques For Raising Panaloid Shrimp" by C. R. Mock and M. A. Murphy from the Proceedings of the First Annual Workshop World Mariculture Society held at Louisiana State University, Baton Rouge, La. on Feb. 9-10, 1970, has been found to be ineffective because any of the glues used have been toxic to macrobrachium larvae. Because of the small size of the larvae the mesh size of the screen must be small enough to retain the larvae in the container and must not contain any openings through which the larvae can flow during the circulation of the water. The surface area of the screen must be large enough so that the larvae which are not strong enough to fight a current do not clump in any one particular area on the screening device and thus cause decreasing flow of the fluid as well as death of the larvae. Further the screening device must be strong enough so that it does not collapse while starting to flow the water through the screen. Thus, a device such as that disclosed in U.S. Pat. No. 3,833,124 would not be useful because it would be affected adversely by the initial flow of water on starting the system. Further it is valuable to be able to replace the screen on the device with a larger mesh size as the animals increase in size.

We have now discovered that the problems with which we were faced and which have not been previously discussed in the art have been solved by the screening device of this particular invention. We have further discovered a particularly successful and efficient system which may be used for closed-loop aquaculture systems particularly for growing prawn larvae such as macrobrachium rosenbergii.

SUMMARY OF THE INVENTION

One aspect of this invention is a screening apparatus which is particularly valuable for retaining small marine animals in a growing container connected to closed-loop aquaculture system. The screening apparatus comprises a first plate;

a second plate about the same size as the first plate and substantially parallel to and spaced from the first plate;

a conduit passing through a centrally-located aperture in the first plate, the end of the conduit being attached to a face of the second plate, the corresponding edges of said plates being about the same distance from the outer wall of the conduit;

a fluid permeable material extending between the edges of said plates and enclosing said conduit by being snugly fitted at least around the periphery of the first plate;

the conduit having apertures around its circumference; and a pump means for transferring a fluid through the conduit. Particularly preferred embodiments will be described hereafter.

Another aspect of this invention is a closed-loop aquaculture system which comprises a container for retaining water and marine animals; the screening device hereinbefore described in the container;

a biological filter;

a pump means for pumping liquid from the container to filter through the conduit of the screening device; and transfer means to transfer liquid from the container to the biological filter and back to said container. Particularly preferred embodiments will be described hereinafter.

Still another aspect of this invention is a process for growing marine animals in a closed-loop aquaculture system which comprises placing the marine animals in a container of water in which there is a screening device hereinbefore described, circulating through the screening device to a biological filter to remove harmful amounts of ammonia and nitrites from the water, while retaining the animals in the water in the container;

returning the water to the container; and feeding the animals. Particularly preferred embodiments will be described hereinafter.

BRIEF DESCRIPTION OF THE DRAWINGS

FIG. 1 is a schematic perspective representation of the screening device of this invention.

FIG. 2 is a schematic perspective representation of the screening device of this invention showing some of the preferred embodiments which are particularly useful in this apparatus.

FIGS. 3a and 3b show an exploded schematic view of the particularly important aspects of the features of the screening device of this invention.

FIG. 4 in a partly schematic, partly diagramatic representation of the closed-loop aquaculture system which employes the screening device of this invention.

FIG. 5 gives a more detailed schematic representation of particularly preferred aspects of the apparatus which is designed to be useful in the closed-loop, aquaculture system for growing small marine animals, particularly prawn larvae.

DESCRIPTION OF PREFERRED EMBODIMENTS

In the following discussion both apparatus and process aspects will be discussed together.

FIG. 1 presents the screening device of this invention in its broadest aspect. Conduit 1 is indicated as a cylindrical enclosure or tube, but may be any desirable shape such as a polyhedron or eliptical shape. Becuase of its ready availability and ease of handling, a cylindrical conduit is preferred. The conduit is sealingly and securely attached to the plate 2 via the aperture 3 and the plate 4 is solidly attached to the conduit by an appropriate means such as being welded, or attached via a circular groove. Preferably, both the conduit and the plates will be a non-toxic material such as natural polypropylene or polyethylene and the points of attachment will be welded.

The plates 2 and 4 are indicated as being substantially circular however these too may have other shapes such as a square, rectangular or other polygonous shape. Generally, however, it is preferred that the plates be circular discs. To minimize strain of the screening device, the outer edges of the plates are located equal distance from the outer periphery of the conduit. The conduit 1 has apertures 6, preferably located around the lower surface of the conduit a short distance from the attachment point 5 to plate 4. These apertures 6 preferably extend only a short distance up the conduit from the plate but may extend along the substantial length of the conduit as long as the conduit is entirely submerged. The area defined by apertures 6 should equal at least the area defined by the diameter of the conduit so that proper flow through the conduit may be established.

Completely enclosing the conduit 1 and being securely fastened at least to the plate 2 around the circumference of the plate as indicated at 8 is a water permeable material. This material is generally a flexible, non-toxic, reticulated material having small mesh openings which allow the water in the system to pass through but retains the small marine animals on the outside of the material and in the container. Particularly useful for this is a nylon mesh having a mesh size of about 150 microns or more, depending on the size of the marine animals. The flexible material may be of cylindrical shape closed on one end which fits over the plate 4 and is attached snugly to plate 2. In such a case the material need only be fastened securely around the circumference at plate 2. The flexible, reticulated material may be cylindrical in shape being open on both ends and thus would be snugly attached around the periphery of both plates 2 and 4.

The screening device is used in a closed-loop aquaculture system and thus is generally used in combination with a pump means (which may include gravity flow) which is used to transfer the water from the container in which the screening device sits to other portions of the closed-loop system. For example the water flows in the direction of the arrows to the conduit 1 through the apertures 6 and through the conduit 1 as indicated by the arrows F. We have found that a particularly efficient means of pumping the fluid around said closed-loop aquaculture system is by air lifting. Thus, in FIG. 1 the pump means is an air lift device indicated as air tube 9 which passes through the conduit via aperture 9a. The air after passing through the tube is released through air stone 9b creating an upward current through the annulus between air line 9 and conduit 1 and thus causing the water to flow in the direction of the arrows.

The size of the screening device may vary from 2 inches to over 2 feet in length and an inch to about 12 inches in diameter. As the size of the screening device shown in FIG. 1 is increased structural problems become apparent thus various support means must be utilized in order to prevent the screen from collapsing and tearing. FIGS. 2 and 3a–3b show several particularly preferred aspects of the invention.

In FIG. 2 the same numerals are indicative of the same parts as in FIG. 1. Here again the device has conduit 1 passing through plate 2 via aperture 3 attaching to plate 4 at point 5. The conduit has apertures 6 while water permeable material 7 encloses the conduit and is attached securely to plates 2 and 4 around their periphery. The pump means is air tube 9, which passes sealingly through aperture 9a in coaxial relationship with the conduit 1, to air stone 9b. Also included is air pressure release port 10. Depending on the length of the distance between plates 2 and 4 at least one other plate is generally required for sufficient support of the water permeable material 7. In FIG. 2, two additional plates 11 and 12 are utilized. These plates are supplied with apertures 30 located around the circumference of the surface the plate as shown for reasons which will be described herein below.

Plate 2 has notches 14, 14a, 14b, 14c. Similarly plates 11, 12 and 4 are also notched as shown at 15, 16, 17, 19, 20 and 21. At least one support bar which extends longitudinally and coaxially with conduit 1 is used to support and space apart plates 2, 4, 11 and 12. In FIG. 2, 4 bars are employed. The size and shape of each of the corresponding notches, e.g. 14, 15, 16, 17, are designed to accept and retain support bar 13 to form a firm under support for the water permeable material 7. Preferably the water permeable material is a flexible, non-toxic, reticular material such as a woven or knitted nylon in the form of a substantially rectangular sheet which is wrapped about the circumference of plates 2, 11, 12 and 4 and is overlapped at bar 18. Because tubular nylon material is difficult to obtain, it is a particularly important aspect of this invention that the unique way of fastening may be used for any readily obtainable nylon sheet. Once bar 18 is snugly established into the corresponding notches 14c, 19, 20, and 21 on respective plates 2, 11, 12 and 4 a groove 22 in FIG. 2 which extends longitudinally the length of bar 18 and is utilized to attach the nylon sheet. The sheet edges are overlapped at bar 18 and are forced into the longitudinally extending groove by inserting an elongated fastening member 18a into the longitudinally extending groove. This secures the nylon sheet within the groove and attaches it securely around the conduit enclosing the conduit and the various plates.

To further securely fasten the nylon sheet around the conduit the sheet is further forced into a groove that runs circumferentially around the edges of plates 2 and 4. This is attached by forcing a flexible attaching means into the groove thus forcing the nylon sheet snugly into each groove and securing the sheet in the grooves. The fastening means may be a nylon thread which may be wrapped around the circumference of the plates 2 and 4 as many times as needed then tied.

A futher elaboration of the particularly preferred aspect of the fastening means of this invention is shown in FIGS. 3a through 3b. In FIG. 3a we see the top plate 2 which is similar to the bottom plate 4. Bar 18 fits snugly into notch 14c, the notch corresponding to those on the other plates. It should be noticed that the vertical fastening bar 18 is grooved both longitudinally and transversely in order to accommodate both flexible fasteners 25 and 18a. Once bar 18 is snugly fit into notch 14c the nylon screen cloth 7 is positioned so that the edges overlap at vertical fastening bar 18. Bar 18a is then forced into groove 22 extending along bar 18 longitudinally to snugly engage and hold the nylon screen cloth 7 in position. By this means one can readily fasten the cloth and remove it when desired. Once the nylon cloth is attached to vertical fastening bar 18 a flexible fastener is forced into circumferentially located groove 24 so that the nylon cloth 7 is forced into the groove and snugly held there by the cord fastener 25. Generally the cord fastener will be a nylon thread or a 3/16 inches polyethylene welding spline, although it may be any suitable means.

Referring again to FIG. 2 the reason for having apertures 30 through plates 11 and 12 is now explained. As the air lift pump operates the water from the container in which the screening device is found goes through perforations 6 in the conduit 1 up the annulus between air line and the conduit and to the rest of the system. If the perforations 30 were not present, the surface area of the screen 7 through which water could flow would be decreased and water would flow through the bottom area of the screen only. This would result in a velocity suction occurring and drawing the marine animals not strong enough to fight the current to clump on the screen. This, in turn, could result in the death of many of the animals and decrease in the efficiency of the system. The presence of the perforations 30 allow the water to flow through the perforations as indicated by the arrows thus preventing a velocity suction from occurring. This also prevents the animals from collecting on the screen.

Turning now to FIG. 4 we can see a diagramatic representation of the system in which the screening device of this invention is particularly valuable. The marine animals are first placed in container 40 where they are cultured and fed. The screening device 42 prevents the animals from moving into the rest of the system indicated. Thus the animals are retained in the container 40 while the water circulates through the system as indicated by the arrows. Air is pumped down air tube 50 to cause an air lift in the annulus formed between the air tube 50 and conduit 48. The water enters through perforations 44 goes up the annulus of conduit 48 through valve 52 and transfer line 54 into a biological filter 56. Air is released through valve 51. At the biological filter the ammonia and nitrites that are present in the system are converted into nitrite and nitrate respectively, the nitrate being generally less toxic than $NH_3$ or $NO_2$. From the biological filter the liquid is transferred through valve 68 and line 58 back into container 40, thus completing the cyclical process. It is often important to pass the liquid through a protein skimmer 60 and a toxic material filter 64 before going back into the container. The protein skimmer 60 may be of any design known in the art and here dissolved organic material is removed and filtered out. After leaving protein skimmer 60 through transfer line 62 any toxic material such as dissolved chlorinated hydracarbons or phthalate esters are removed at the toxic material filter 64. Preferably the filter will be a polyurethane foam. It is particularly valuable in a system such as this to include a loop around biological filter 56. Thus, if the animals are being harvested from container 40 and the container is disconnected from the rest of the system, valve 52 may be closed as well as valve 68 and valve 70 opened so that the biological filter can be maintained in an aeorbic state by circulating the water and oxygen in the system between valve 68 and 52 through the filter using pump 69. Preferably throughout the system the liquid is transferred by means of air pumps since air pumps are much easier to operate, have fewer moving parts and are much less expensive then positive displacement liquid pumps which are generally in use. The simplicity of this system is apparent especially when compared to systems which are known in the art such as the system described in U.S. Pat. No. 3,661,262 to Sanders.

Turning now to FIG. 5, a particularly successful apparatus and process is described for growing small marine animals, e.g. prawns such as macrobrachium species. The success of the system is attributed to the screening device previously described along with a particular design of biological filter to be described hereafter. Other important contributing factors are the use of a toxic material filter which is a polyurethane foam. It is also an important aspect of this particular system that as many of the parts, that is the container, the screening device, the biological filter, the protein skimmer and the toxic chemical filter be made of non-toxic material such as natural polypropylene, polyethylene, glass, concrete, or tile. It is also particularly valuable to employ air pumps throughout the system to transfer the water. The larvae are grown in container 100 and are kept from getting into the transfer lines of the system, for example 114, by the screening device indicated generally at 102. Air enters through air line 104 which is coaxially related to fluid conduit 108 and is attached to said conduit at aperture 105. The air being released through air stone 106 creates an upward current through the annulus created between the outer wall of the air tube and the inner wall of the conduit 108. Water from container 100 flows through the flexible, reticulated material 109 into the perforations 107 and up the annulus through transfer line 114 and valve 134 to enter the biological filter 118 through valve 116 at the base of the biological filter. Air pressure is released through valve 113. The biological filter 118 is equipped with a water permeable support means 120 a short distance above the inlet port for the water. The water permeable support means may be a perforated disc or other material supported on legs or may be integrated into the structure of the outer container 122 of the biological filter. Supported on the support means is a biological filter medium 121 such as sand, gravel or polyurethane foam upon which nitrosomas or nitrobacter organism can readily grow. These organism convert ammonia to nitrite and nitrite to nitrate respectively. The water flows upward through the biological filter and out the transfer line 124.

It has been found particularly advantageous to include a means for adding an oxygen-containing gas, e.g. air, directly to the filter medium while passing the water through the biological filter. This increases the efficiency of the biological filter by a great degree. The means of adding oxygen directly to the biological filter is indicated as being cross arms 130 having perforations 133 across the upper surface of the arms. Air enters through the air line 131 and goes into the biological filter by going through the perforations and up through the biological filter medium 121. Although the design is here shown to be cross arms for adding the oxygen directly to the filter other design such as an air stone, a series of concentric circles, a spiral, a square, or concentric squares could also be used. This particular design of biological filter wherein the water flows into the base of the filter and out the top is particularly valuable because if there are any large particles entrained in the water coming in through valve 116 the large particles are filtered out at the base of the filter and dropped to bottom of the filter around the means for adding oxygen directly to the filter. After particles have collected in the base filter they can easily be washed out by back flushing the filter and opening drain valve 132 to allow the particles and the wash water to drain to a proper receptacle.

Another unique aspect of this particular biological filter is that it is set up to be maintained in an aeorbic condition even while the container 100 is separated from the rest of the system. This can be performed as follows:

Once water is circulating through the system and the biological filter is filled with water valve 134 is closed while valve 116, 126 and 138 are open. While container 100 is being cleaned or the larvae harvested, water continues to recirculate through valve 116 up through the biological filter to transfer line 124 through line 136 and valve 138 and back into line 114 and thus back to the biological filter. The transfer is maintained by continually pumping air through line 135 to air lift the water flowing into container 142 through the annulus between 136 and air line 135, air pressure being released at valve 137. Thus, the biological filter is maintained in a aerobic condition and need not be re-generated when the container 100 is placed back into circulation with the rest of the system.

Continuing now on through the rest of the system, assuming valve 126 and 134 are open along with valve 178 and 188 but 138 is closed, the water passes through valve 126 into a protein skimmer 140 where dissolved organics are removed by action of air and water. The protein skimmer can be of any design known in the art such as that described in U.S. Pat. No. 3,616,919 to Feddern or those shown at pp. 52–56 in the book entitled *Fish and Invertebrate Culture Water Management in Closed Systems* by Steven H. Spotte, published by Wiley Interscience, 1970. The water enters container 142 of the protein skimmer. Inside and coaxially located within container 142 is tube 144 having perforations 146 located in the bottom of the tube. The water flows through the perforations to substantially fill the inner tube 144 in which there is another enclosure 148 which is coaxially disposed within the tube 144 to form an annular passage between the inner enclosure 148 and the outer tube 144. The upper end of inner tube 148 is open and an air line 156 is coaxially disposed in the inner tube 148 and ends in an air stone 158 disposed at the bottom of inner tube 148. Air line 156 is connected to an air source not shown.

The upper end of the outer tube 144 is closed off by centrally apertured disc 160 and a double ended funnel 162 is coaxially disposed surrounding the air line 156 and above the open end of the inner tube 148. The funnel 162 is sealed at its waist to the central aperture in the end closing disc 160. In addition the funnel 162 includes an axially directional tubular portion 163 extending between the two cones of the double funnel and coaxially surrounding the air line 156. A collecting substrate such as glass wool or aquarium floss 166, is disposed within the upper end of the funnel 162. A pair of drain ports 168 are provided in the bottom of the upper funnel portion for draining excess liquid back into the chamber 142.

Water is air lifted from the bottom of inner tube 144 back to the skimmer chamber 142 via an air lift pump comprising a pump line 154 connected into the base of the inner tube 148 and an air line 152 extending downward which is connected to an air source not shown. Pump line 154 is connected to tube 144 at 155. The air line 152 leads air into the water line 154 for lifting the water from the inside of tube 144 back to the protein skimmer chamber 142. A gravity return line 176 or other means returns water from the protein skimmer chamber 142 back to the aquaculture tank 100, such a return line 176 including the valve 174.

In operation water is pumped through the protein skimmer by means of air lift pump consisting of line 154 and air line 152. The water flows into the protein skimmer chamber 142 through valve 126 and into the space between the walls of the container 142 and the centrally disposed tube 144. Water flows down around the outside of the outer tube 144 and into the annular space between inner tube 148 and outer tube 144 then down the inside of tube 148 to the output line 150. The air stone 158 is supplied with air via air line 156 and produces a rising cloud of small air bubbles and counter flowing relation to the flowing water stream.

These counter flowing streams increase the contact between the air bubbles and the water. Suspended and dissolved organic matter is surface active and thus accumulates at the air water interface of each of the bubbles and therefore causes a foam to be produced at the upper surface of water, i.e. at the upper end of open tube 148. This foam passes upwardly through the annular space between the air line 156 and the tubular extension 163 and into the upper funnel 162 for collection on the glass wool 166. The excess water returns to the chamber 142 via the drains 168. The glass wool material 166 is periodically replaced to maintain efficient removal of the foam material.

Most of the water flow through the purifier 140 is returned to the aquaculture tank via line 176 through valve 174. However, a portion of the water in the protein skimmer chamber 142 passes into a filter chamber 180 through line 172 and valve 178 where toxic chemicals are removed. The filter chamber may be of any design that is known in the art and may be comprised of activated charcoal or other material which are known to absorb toxic materials. However, it is preferable that the filter chamber be a chamber containing a polyurethane foam. For purposes of this application that application is incorporated herein by reference.

After passing through the toxic chemical filter the water returns through line 186 and valve 188 back to container 100 where the cycle begins again. By utilizing the process and apparatus of this invention the flow rates through the various sections of the system may be adjusted merely by adjusting valves 188 and 174.

We claim as our invention:
1. A closed-loop aquaculture system comprising
   a container;
   a screening apparatus located in said container, said apparatus comprising a first plate having a groove extending circumferentially about the edge of said first plate; a second plate parallel to, spaced from, and about the same size as said first plate; a conduit passing through said first plate, the end of said conduit being attached to a face of said second plate, the corresponding edges of said plates being about the same distance from the outer wall of said conduit, said conduit being apertured along its length;
   a flexible, non-toxic, reticulated material extending between the edges of said plates and enclosing said conduit by being snugly fitted about the periphery of said first and second plates and being attached to said first plate by a flexible fastening means engagingly fitting over said material and into said groove so that the material and the fastening means are engagingly located in said groove;
   a biological filter;
   a pump means for pumping liquid in said container through said apertures and conduit to said biological filter; and
   a transfer means to transfer liquid from said container to said filter and back to said container.

2. The apparatus of claim 1 wherein said apertures in said conduit are located at the end of the conduit a short distance from said second plate and said pump means comprises an air delivery tube, said tube being coaxially located within said conduit and ending a short distance from said apertures in said conduit.

3. The apparatus of claim 1 which also includes
   a protein skimmer means located downstream from said biological filter,
   a toxic chemical filter located downstream of said protein skimmer means, and liquid transfer means, to transfer liquid to said protein skimmer and toxic chemical filter and back to said container.

4. The process of claim 3 wherein said toxic materials filter means is a polyurethane foam having a polyurethane composition made by reacting from about 60% to 85% by weight of a hydroxylated polyether with about 40% to 15% by weight tolylene diisocyanate.

5. The apparatus of claim 1 wherein said biological filter comprises
   an elongated enclosure being closed at the base, said enclosure having at least one liquid inlet at the base of said elongated enclosure, said enclosure being arranged to retain water when flowing in through the inlet,
   a liquid-permeable support means above said inlet,
   a porous medium sufficient to grow nitrosomas and nitrobacter organisms supported on said support means, and
   a liquid outlet located above said porous medium.

6. The apparatus of claim 5 wherein a means for adding oxygen-containing fluid is located below said porous support means in said biological filter.

7. The apparatus of claim 6 wherein the components of said biological filter are made of natural polypropylene or polyethylene.

8. The apparatus of claim 6 wherein a drain means is located below said support means to drain the biological filter by backflushing.

9. The apparatus of claim 2 wherein said toxic materials filter is a polyurethane foam filter having a polyurethane composition made by reacting from 60 to 85 parts by weight of a hydroxylated polyether with 40 to 15 parts by weight to tolylene diisocyante.

* * * * *